(12) United States Patent
Gove et al.

(10) Patent No.: US 10,036,571 B1
(45) Date of Patent: Jul. 31, 2018

(54) FORCED AIR HEATER BURNER

(71) Applicant: Enerco Group, Inc., Cleveland, OH (US)

(72) Inventors: Scott Gove, Avon Lake, OH (US); Brian Streisel, Garrettsville, OH (US)

(73) Assignee: ENERCO GROUP, INC., Cleveland, OH (US)

( * ) Notice: Subject to any disclaimer, the term of this patent is extended or adjusted under 35 U.S.C. 154(b) by 944 days.

(21) Appl. No.: 14/251,046

(22) Filed: Apr. 11, 2014

Related U.S. Application Data (60) Provisional application No. 61/811,313, filed on Apr. 12, 2013.

(51) Int. Cl.
  *F23D 14/58* (2006.01)
  *F24H 3/04* (2006.01)
  *F23D 14/14* (2006.01)
  *F24H 9/00* (2006.01)

(52) U.S. Cl.
  CPC ......... *F24H 3/0488* (2013.01); *F23D 14/145* (2013.01); *F24H 9/0073* (2013.01)

(58) Field of Classification Search
  CPC .... F24H 3/0488; F24H 9/0073; F23D 14/145; F23D 14/14; F23D 14/16; F23D 14/36; F23D 14/62; F23D 14/70; F23D 2900/11401; F23D 14/58; F23D 14/82
  See application file for complete search history.

(56) References Cited

U.S. PATENT DOCUMENTS

| | | | |
|---|---|---|---|
| 3,857,670 A * | 12/1974 | Karlovetz | D06F 67/02 431/329 |
| 4,615,895 A | 10/1986 | Bhattacharjee | |
| 4,825,846 A | 5/1989 | Fraioli | |
| 4,889,103 A | 12/1989 | Fraioli | |
| 4,917,599 A | 4/1990 | Hasselmann | |
| RE33,374 E | 10/1990 | Bhattacharjee | |
| 5,017,129 A | 5/1991 | Velie et al. | |
| 5,137,445 A | 8/1992 | Chu | |
| 5,222,474 A | 6/1993 | Yencha, III | |
| 5,249,956 A | 10/1993 | Chu | |
| 5,325,842 A | 7/1994 | Beach et al. | |
| 5,408,984 A | 4/1995 | Maughan | |
| 5,470,222 A | 11/1995 | Holowczak et al. | |
| 5,540,213 A | 7/1996 | Shell et al. | |
| 5,865,616 A | 2/1999 | George | |
| 7,857,616 B2 | 12/2010 | Carbone et al. | |
| 7,874,835 B2 | 1/2011 | Schwank et al. | |
| 8,276,579 B2 | 10/2012 | Bruckner | |
| 2006/0141412 A1 | 6/2006 | Masten et al. | |

\* cited by examiner

*Primary Examiner* — Alfred Basichas
(74) *Attorney, Agent, or Firm* — Tucker Ellis LLP; Michael Craig (57) ABSTRACT

One or more techniques and/or systems are disclosed for a burner assembly. The burner assembly can comprise a tube that introduces a combustible fuel into a burner chamber, through an opening in a solid back wall plate. The burner chamber can be defined by the solid back wall plate, a solid front wall plate, and a side wall, where the side wall can comprise a mesh layer and/or a ridged porous layer. The fuel can be expelled from pores disposed in the side wall to the outer periphery of the burner's side wall in a substantially uniform manner, where combustion of the fuel can produce a relatively uniform, omni-directional flame at the outer surface of the burner's side wall.

13 Claims, 12 Drawing Sheets

FORCED AIR HEATER BURNER

CROSS-REFERENCE TO RELATED APPLICATIONS

This application claims priority to Provisional Patent Application, U.S. Ser. No. 61/811,313, entitled FORCED AIR HEATER BURNER, filed Apr. 12, 2013, which is incorporated herein by reference.

BACKGROUND

Heaters emit heat. Some heaters combust fuel in air to produce heat. Fuel-fired portable heaters such as forced-air heaters find use in multiple environments. A heater can comprise a housing (e.g., cylindrical shaped) with a combustion chamber disposed coaxially therein. A combustible liquid (e.g., or compressed gas) fuel can be provided from a fuel tank and can be atomized and mixed with air at a burner, where it may be combusted, resulting in the generation of a flame. During combustion of the fuel, a blower may be operated by an electric motor to draw ambient air into the heater to be heated by the combustion of the fuel. The heated air can be expelled out of the heater by the continuous influx of air caused by the blower.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, in one implementation, a burner assembly comprises a front wall plate, at least one side wall, comprising a mesh layer and/or a ridged porous layer, and a back wall plate. The combination of the front wall plate, side wall and a back wall plate can define a burner chamber. The back wall plate can comprise a through hole configured to receive a fuel, and a fuel supply tube can be operably engaged with the back wall plate to direct the fuel into the burner chamber. The burner chamber can be configured to cause the fuel mixture to be expelled around an outer periphery of the side wall in a substantially uniform manner.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1A:
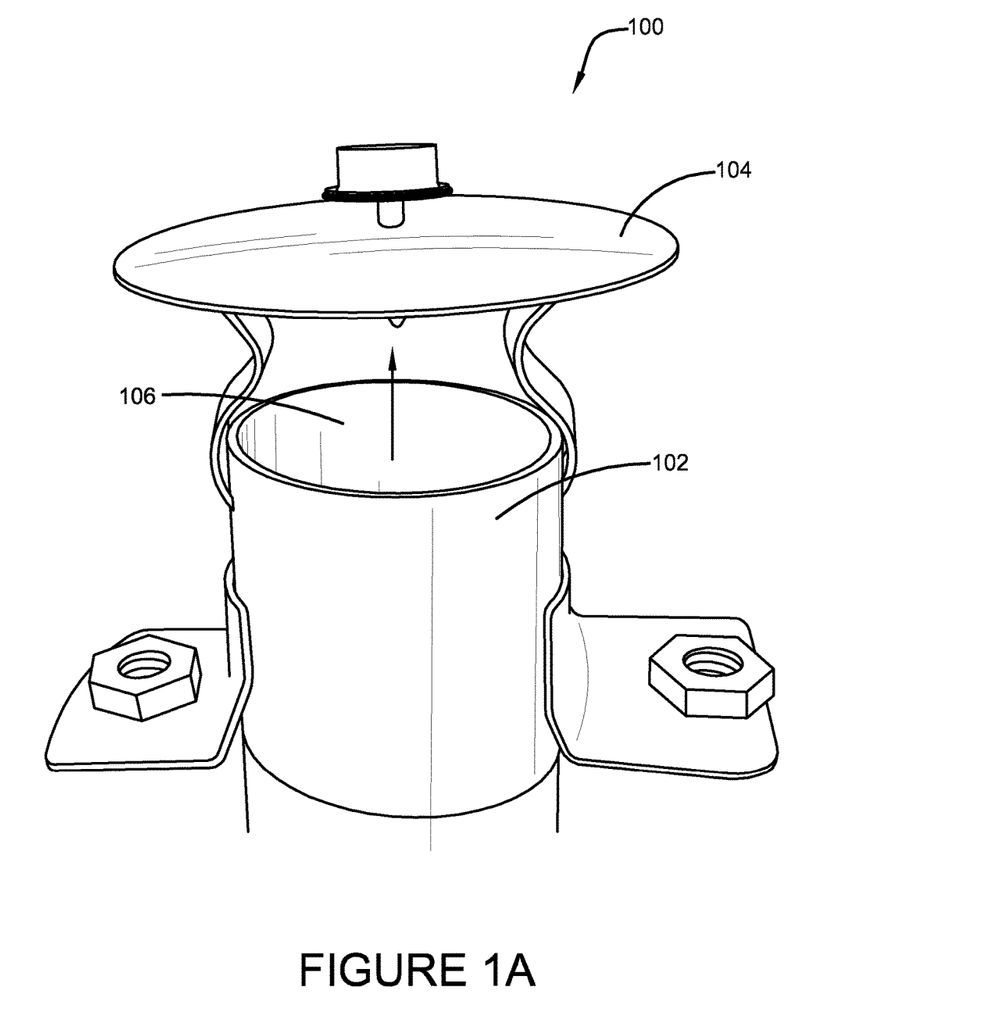
FIGS. 1A and 1B are component diagrams illustrating perspective views of a burner assembly.
Figure 1B:
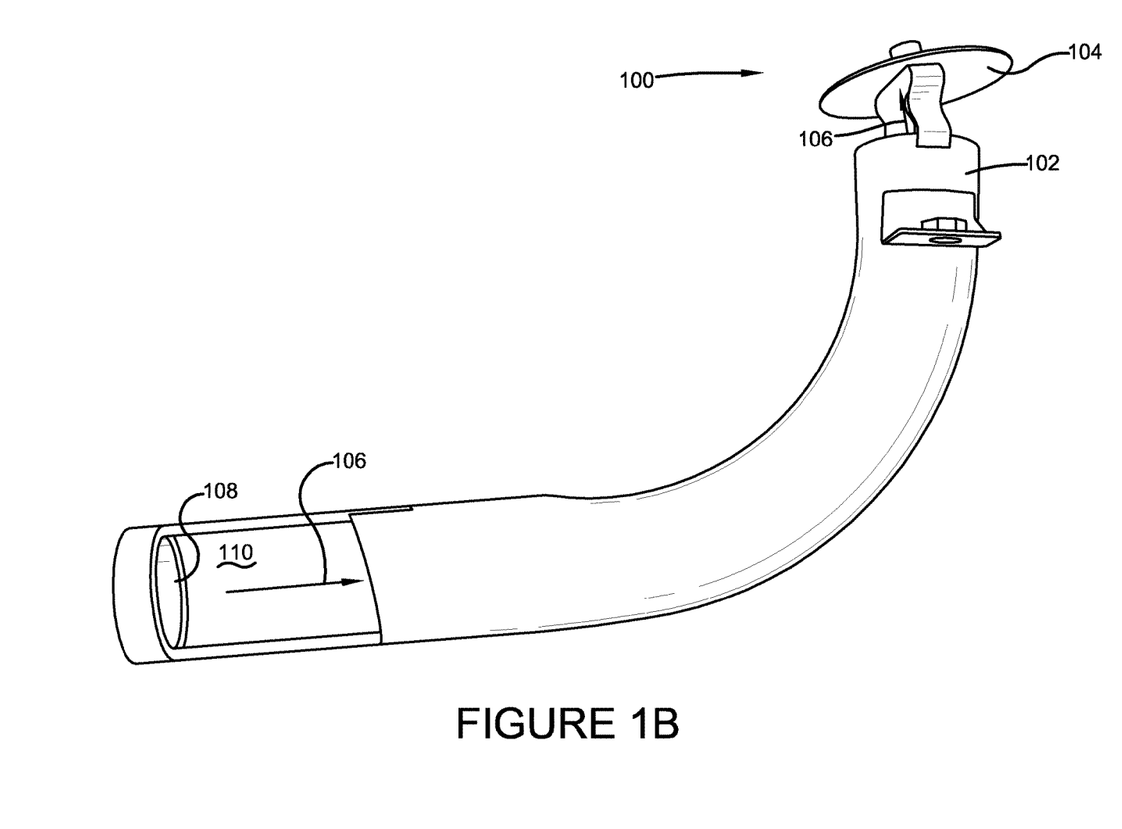

FIGS. 1A and 1B are component diagrams illustrating perspective views of a burner assembly. As an example, a commonly utilized burner assembly 100 for a forced air heater may comprise a fuel-air mixture supply pipe 102 and a burner plate 104. In this example, a fuel-air mixture ("fuel") may be directed 106 from the fuel-air mixture supply pipe 102 against the burner plate 104, where an igniter (not shown) may ignite the atomized fuel. In FIG. 1B, for example, this type of burner assembly 100 may be installed on a fuel-air mixture supply pipe 102 that extends to a fuel output port 108, from which atomized fuel may be directed 106 into the fuel-air mixture supply pipe 102. Further, in this example, an air supply port 110 may be disposed between the fuel output port 108 and the fuel-air mixture supply pipe 102; and the air supply port 110 may supply an appropriate amount of air to the fuel directed 106 toward the burner plate 104.

Figure 2:
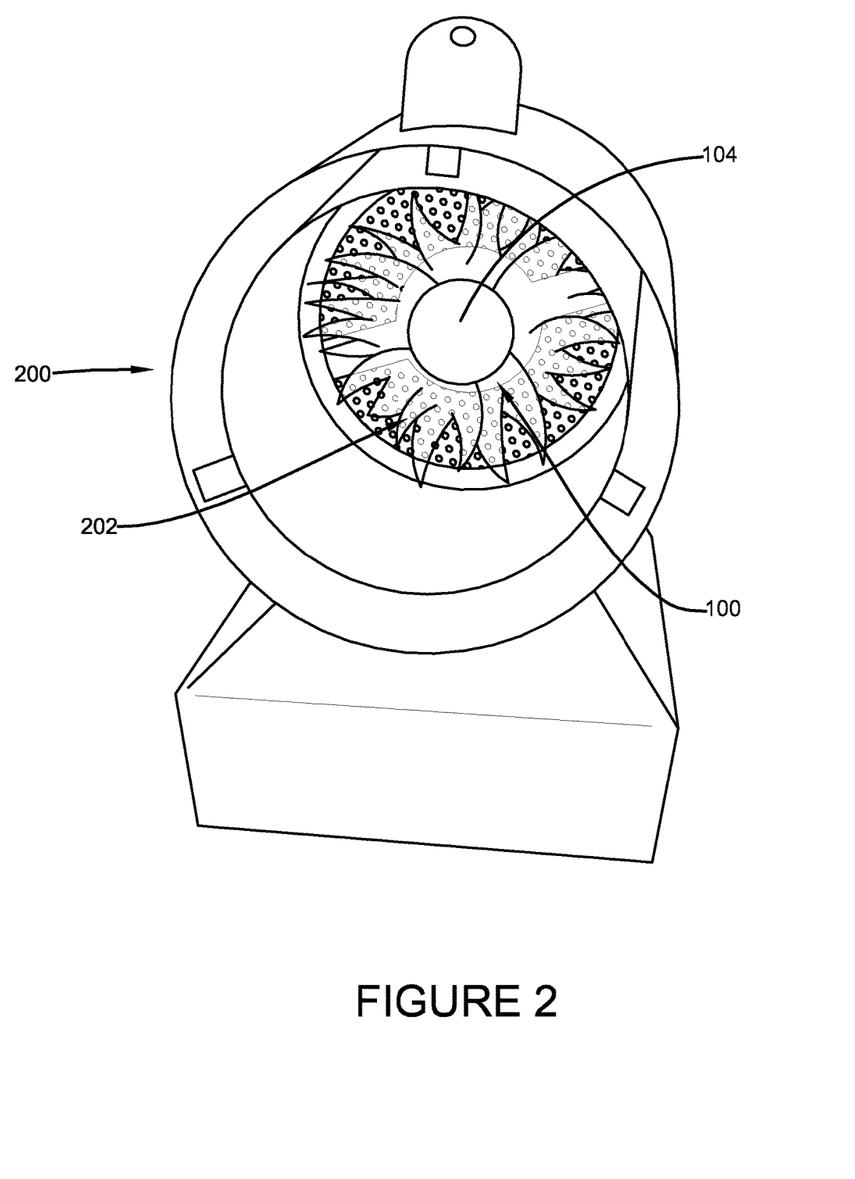
FIG. 2 is a component diagram illustrating a perspective view of an example implementation of a burner assembly.

FIG. 2 is a component diagram illustrating a perspective view of an example implementation of a burner assembly, such as the burner assembly 100 described above. With continued reference to FIGS. 1A and 1B, as an example, the burner assembly 100, installed on the fuel-air mixture supply pipe 102 (e.g., as in FIG. 1B), may be installed in a forced air heater 200. In this example, the burner assembly 100 can be disposed in a relative center of a duct, in front of a blower assembly (not shown) configured to blow incoming air past the burner assembly 100. In one implementation, the fuel output port 108 may be operably coupled with a fuel supply stored locally in a storage tank. Once the fuel is ignited, this type of burner assembly provides a wide, non-compact and non-uniform flame 202 within the duct of the forced air heater 200. Further, for example, the blower assembly blows incoming (e.g., from the rear) air past the flame 202, thereby heating the incoming air before it is forced out the front of the forced air heater 200.

A burner assembly may be devised that provides improved flame characteristics, improved port loading providing higher British Thermal Unit (BTU) output, thereby allowing use of a smaller (e.g., and therefore quieter) blower assembly while providing more desirable heating output. A substantially enclosed burner chamber with a reduced open orifice surface area may allow for higher fuel pressure at a burning surface, producing a relatively uniform flame with shorter and sharper flame definition, which has reduced burning surface lift-off, resulting in improved flame characteristics and more desirable heating output.

Figure 3:
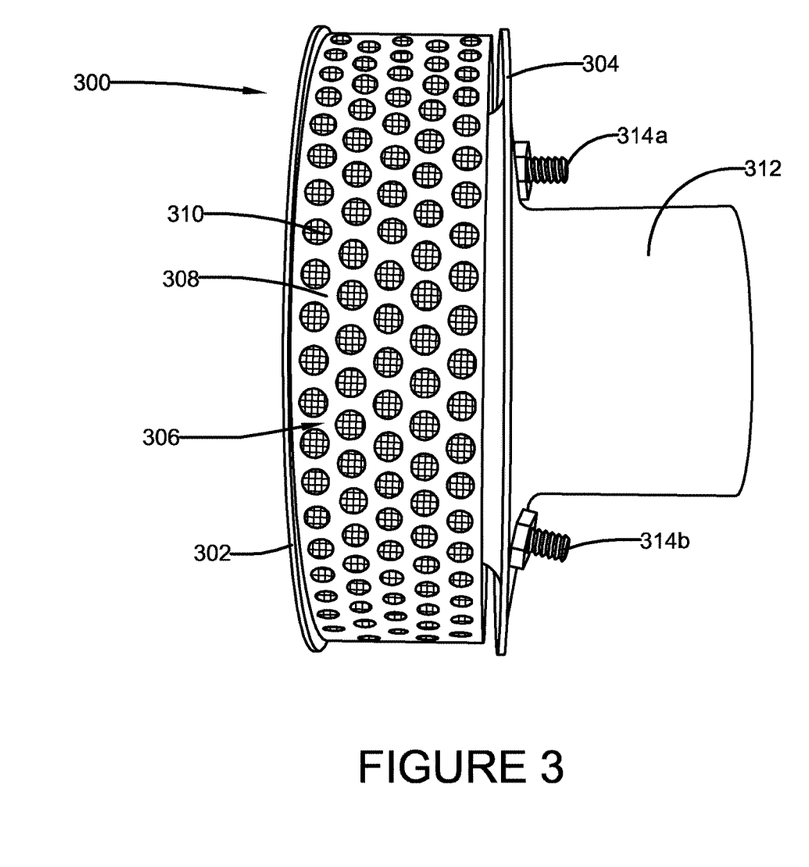
FIG. 3 is a component diagram illustrating a side view of an exemplary burner assembly described herein.
Figure 4:
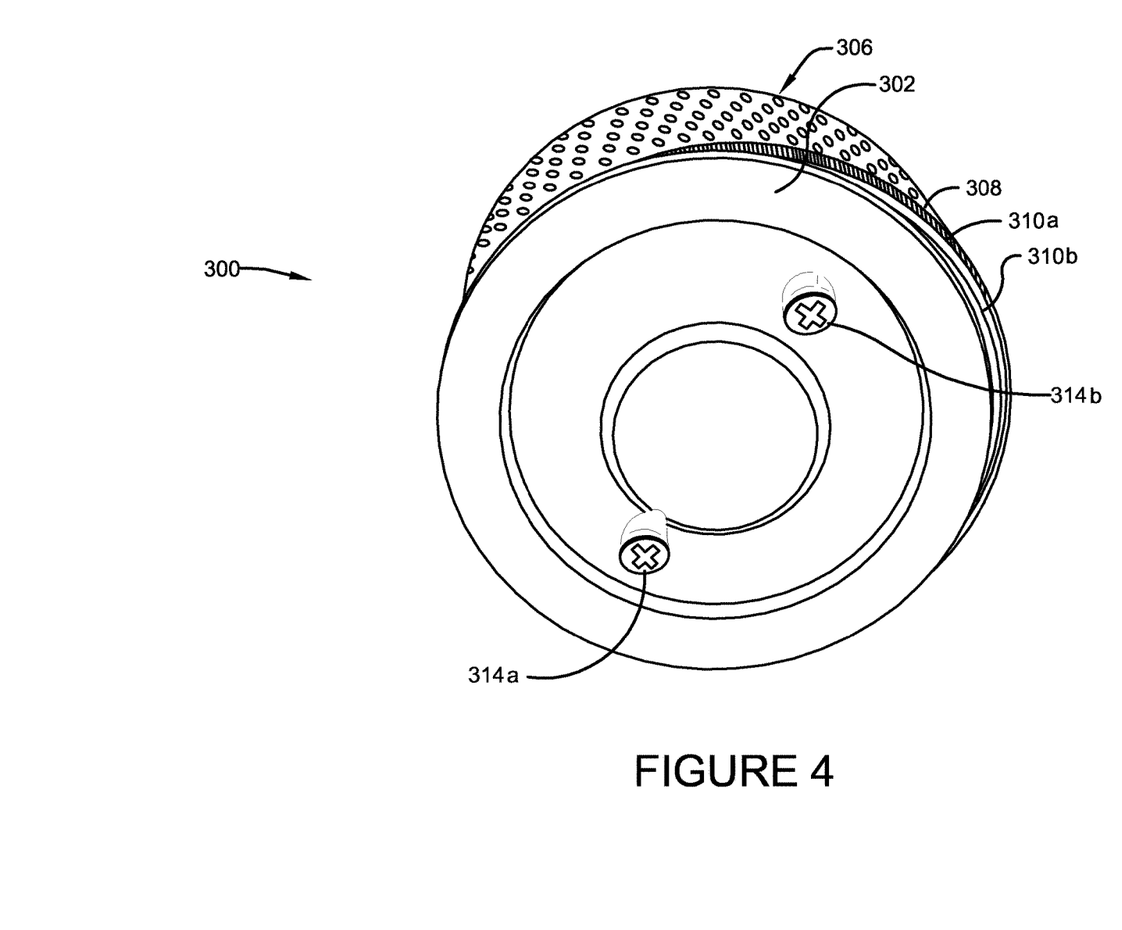
FIG. 4 is a component diagram illustrating a top perspective view of an exemplary burner assembly described herein.
Figure 5:
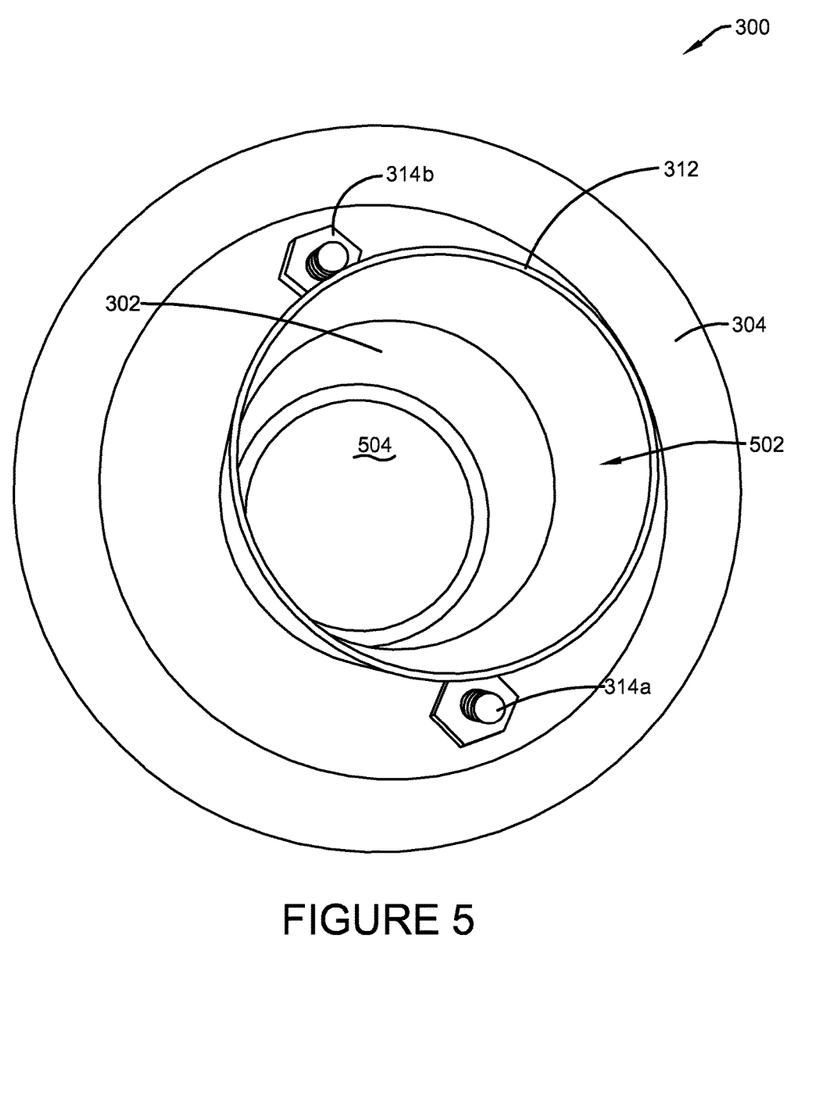
FIG. 5 is a component diagram illustrating a bottom perspective view of an exemplary burner assembly described herein.

Now with reference to FIGS. 3-6A, comprising component diagrams illustrating an exemplary burner assembly 300: FIG. 3 comprises a side view of the exemplary burner assembly 300; FIG. 4 comprises a top perspective view of the exemplary burner assembly 300; FIG. 5 comprises a bottom perspective view of the exemplary burner assembly 300; and FIG. 6A comprises an exploded view of the exemplary burner assembly 300. In this implementation, the exemplary burner assembly 300 comprises a front wall plate 302, at least one side wall 306 and a back wall plate 304. A combination of the front wall plate 302, the side wall 306, and a back wall plate 304 define a burner chamber 504. In one implementation, the side wall 306 may comprise an annular shape. In another implementation, the burner assembly 300 may comprise a plurality of side walls 306 (e.g., comprising a polygonal shape), respectively engaged with each other to form a side wall component (e.g., 306).

Figure 6A:
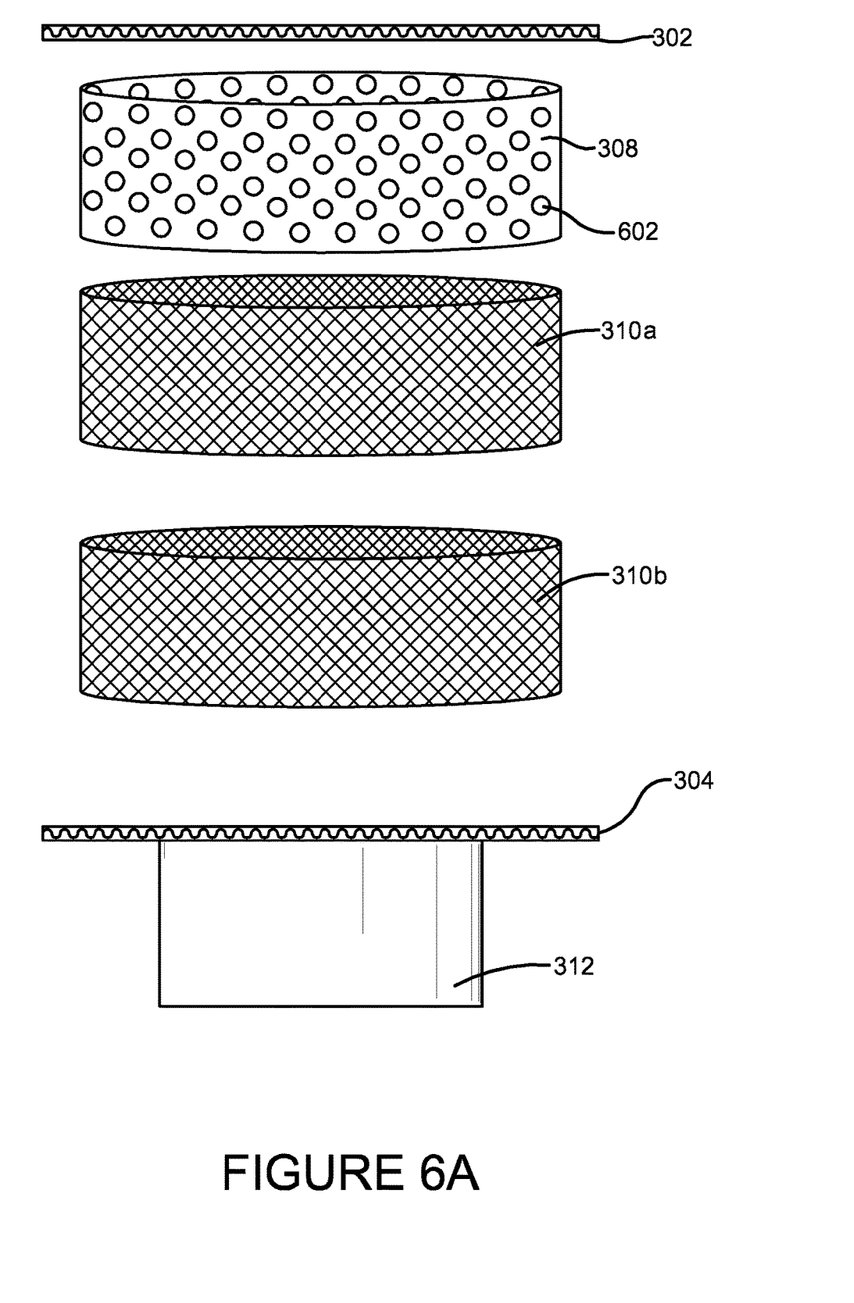
FIG. 6A is a component diagram illustrating an exploded view of an exemplary burner assembly described herein.

In one implementation, the at least one side wall can comprise a ridged porous layer 308, and/or a mesh inner layer 310. In one implementation, the mesh inner layer 310 may comprise two mesh layers 310a, 310b (e.g., a double fine mesh), one inside the other. As an example, as illustrated in FIGS. 4 and 6, a first mesh layer 310b may be surrounded by a second mesh layer 310a. In one implementation, the mesh inner layer 310 may comprise a fine metal mesh, such as one comprising a thirty to seventy percent open screen (e.g., thirty to seventy percent of the surface area of the mesh layer comprises via between the inside and outside of the layer). In one implementation, a combination of two layers of a fine metal mesh may provide a twenty to sixty percent open screen area (e.g., twenty to sixty percent of the surface area of the combined mesh layer comprises vias between the inside and outside of the layer). In another implementation, one or more portions of the mesh inner layer may comprise a heat resistant material, such as ceramic, rock wool, fiberglass, calcium silicate, vermiculite, silica-based materials, polymers (e.g., polycarbonate), nanocomposites, etc., or various types of metals and/or metal alloys devised by those skilled in the art.

In one implementation, the ridged porous layer 308 may comprise a porous metal layer, for example, where a plurality of pores (e.g., through holes or vias) are formed (e.g., milled, forged, cut-out, machined, stamped, etc.) in metal sheet. In one implementation, the number, size, shape and/or patterning of the pores may be devised to provide a desired percentage of open area between the front side and back side of (e.g., through) the metal sheet. In this way, for example, those skilled in the art may devise a number, size, shape and/or patterning combination of the pores that provides a desired resulting fuel output from the burner chamber, alone, or in combination with the mesh layer 310. As one example, a desired orifice opening between the burner chamber and the outer surface of the side wall may comprise ten to thirty percent. In one implementation, this desired orifice opening may be provided by merely the mesh layer 310 (e.g., comprising one or more mesh layers, such as 310a, 310b), merely the ridged porous outer layer 308, or a combination of both the mesh layer 310 and ridged porous outer layer 308. That is, for example, ten to thirty percent of the surface area of the side wall may comprise vias between the inside of the burner chamber to the outside of the side wall.

In one implementation, one or more portions of the ridged porous layer 308 may comprise heat resistant material, such as ceramic, fiberglass, calcium silicate, vermiculite, silica-based materials, polymers (e.g., polycarbonate), nanocomposites, etc., or various types of metals and/or metal alloys devised by those skilled in the art. In one implementation, the plurality of pores in the ridged porous layer 308 may be formed by a sintered material, such as formed from powdered metals or metal alloys, or other types of heat resistant material selected by those skilled in the art.

As illustrated in FIGS. 3, 5 and 6A, the exemplary burner assembly 300 can comprise a fuel (e.g., fuel-air mixture) supply tube 312 that is operably engaged with the back wall plate 304. In this implementation, the back wall plate can comprise a through-hole 502, configured to receive a fuel (e.g., atomized liquid fuel mixed with air, compressed gas fuel, etc.) into the burner chamber. Further, the fuel supply tube 312 can be configured to direct the fuel into the burner chamber, through the through-hole 502 of the back wall plate 304. As an example, the fuel supply tube 312 may be bonded (e.g., welded, glued, soldered, brazed, form integrally with, etc.) to the back wall plate 304 in alignment with the through-hole 502 of the back wall plate 304. In this way, for example, the fuel routed into the fuel supply tube 312 can be directed into the burner chamber 504 through the through-hole 502 of the back wall plate 304.

In one implementation, the burner chamber 504, formed by the combination of the front wall plate 302, back wall plate 304 and side wall(s) 306, can be configured to cause the fuel to be expelled around an outer periphery of the side wall(s) 306 in a substantially uniform manner (e.g., through the vias comprised in the side wall). As an example, the fuel may be forced, under pressure, into the burner chamber 504. In this example, the non-porous front wall plate 302 and back wall plate 304 may mitigate leakage of fuel from these areas, thereby forcing the fuel out through the plurality of pores (e.g., vias, open areas) in the side wall(s) 306. Further, in this example, because the number, size and patterning of the pores is relatively uniform across the surface of the side wall(s) 306, the fuel can be emitted from the plurality of pores to the outer surface of the side wall(s) 306 in a relatively uniform manner. In one implementation, the fuel may be emitted from the side-wall at between ten and thirty pounds per square inch (PSI).

In one implementation, as illustrated in FIGS. 3-6A, the front wall plate 302 and the back wall plate 304 can be selectively coupled together by one or more fasteners 314. As one example, a first fastener 314a (e.g., comprising a nut and bolt, screw, rivet, clamp, or other appropriate fastening device) may be disposed at a first side of the burner assembly 300, and a second fastener 314b (e.g., comprising a nut and bolt, screw, rivet, clamp, or other appropriate fastening device) can be disposed on a second side of the burner assembly 300 (e.g., a third fastener, fourth fastener, etc. may also be implemented). In this implementation, through holes in the respective front wall plate 302 and back wall plate 304, at appropriate locations, can accommodate the fasteners 314.

It will be appreciated that, while an example of a fastening system is illustrated and discussed, holding or fastening the components of the burner assembly together is not limited to the examples described herein. It is anticipated that those skilled in the art may devise alternate fastening techniques and/or systems, for example, such as press fitting, crimping, welding/brazing/soldering, spindle assembly, and more.

Figure 6B:
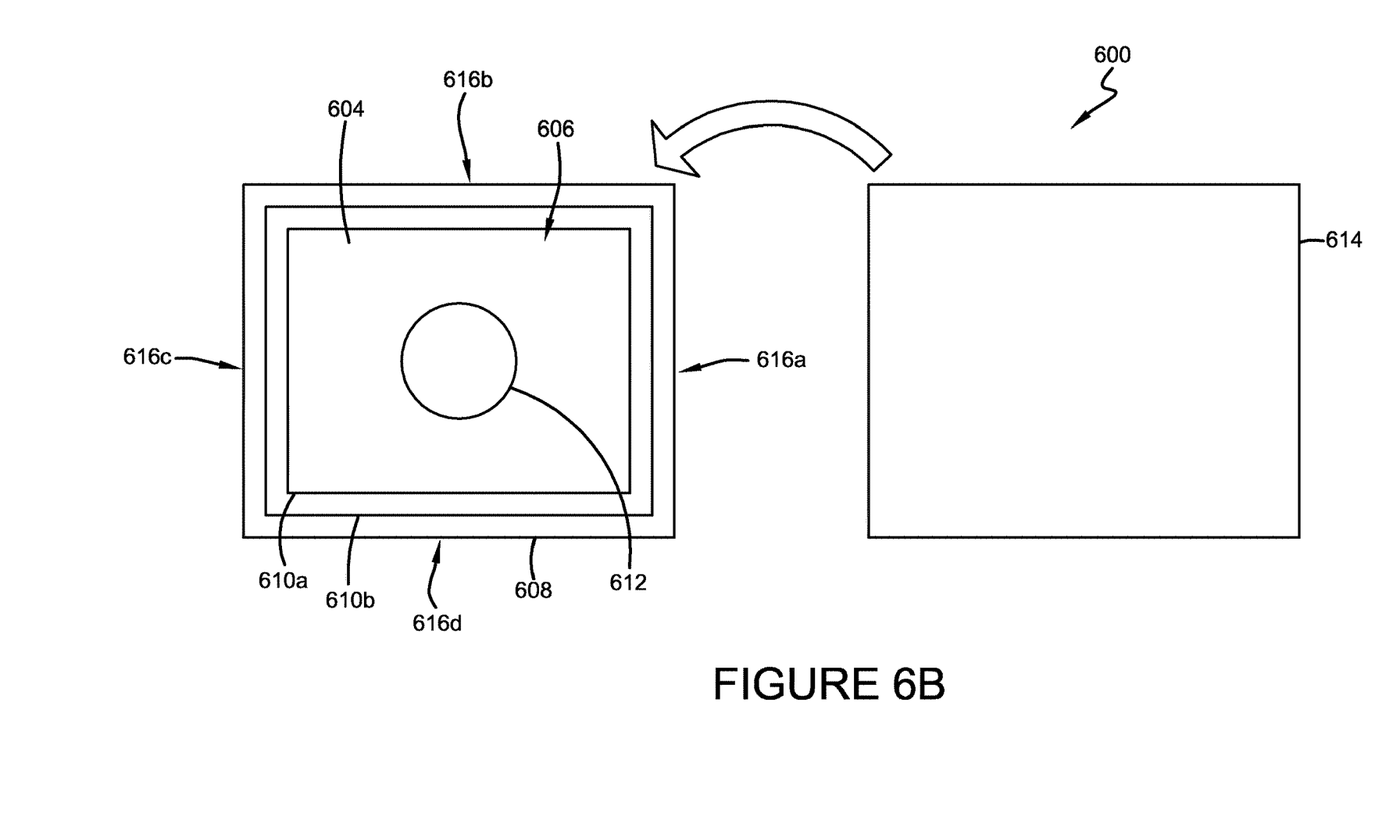
FIG. 6B is a component diagram illustrating a top perspective of an alternate implementation of an exemplary burner assembly.

FIG. 6B is a component diagram illustrating a top perspective of an alternate implementation of an exemplary burner assembly 600. As described above, the exemplary burner assembly, described herein, may comprise one wall (e.g., as in an annular arrangement in FIGS. 3-6A), or may comprise a polygon shaped arrangement, comprising more than one wall, and illustrated in the example implementation 600 of FIG. 6B. In this example, the exemplary burner 600 comprises four walls 616a, 616b, 616c, 616d.

In one implementation, the respective side walls 616 can comprise a ridged porous layer 608, and/or a mesh inner layer 610. In one implementation, the mesh inner layer 610 may comprise two mesh layers 310a, 310b, one inside the other. As an example, a first mesh layer 610 may be surrounded by a second mesh layer 610b. Further, the exemplary burner assembly 600 can comprise a front wall 614 and a back wall 604, where the combination of the side walls 616, front wall 614, and back wall 604 define a burner chamber 606. Additionally, in this implementation, the burner assembly 600 can comprise a through-hole 612 for providing the fuel mixture to the burner chamber 606.

Figure 7:
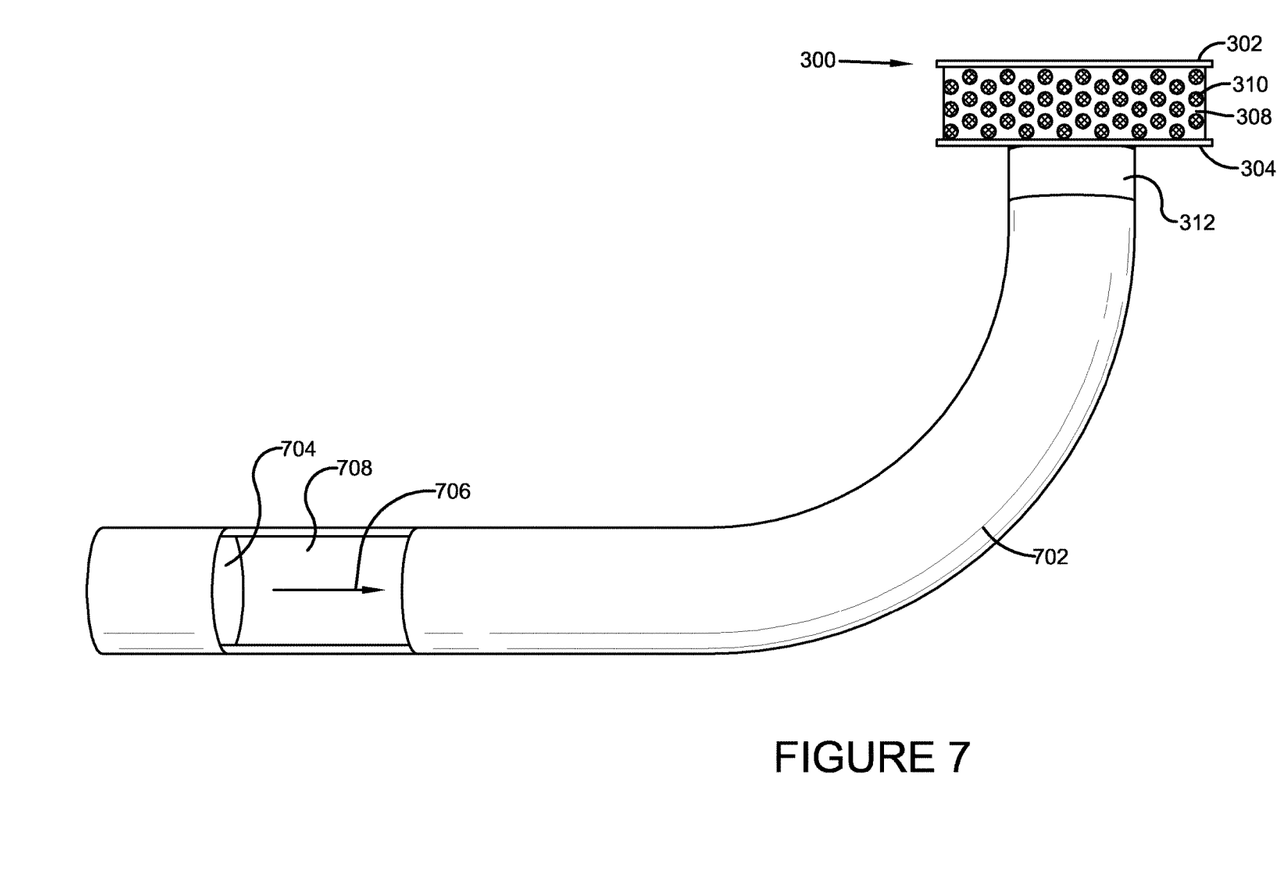
FIG. 7 is a component diagram illustrating an example implementation of an exemplary burner assembly described herein.

FIG. 7 is a component diagram illustrating an example implementation of the exemplary burner assembly 300. With continued reference to FIGS. 3-6A and 6B, as an example, the exemplary burner assembly 300 can be installed on an elongated fuel supply pipe 702 that extends to a fuel output port 704. As another example, the fuel supply pipe 312 may extend from the back wall plate 304 to the fuel output port 704. In one implementation, atomized fuel (e.g., or fuel in the form of a gas, such as propane, natural gas, methane, etc.) may be released from the fuel output port 704 and directed 706 into the fuel supply pipe 702 (e.g., or elongated fuel supply pipe 312). Further, in this implementation, an air supply port 708 may be disposed between the fuel output port 704 and the fuel supply pipe 702 (e.g., or elongated fuel supply pipe 312), and the air supply port 708 may supply an appropriate amount of air to the fuel directed 706 toward the exemplary burner assembly 300.

In another implementation, the fuel supply pipe (e.g., 702) may comprise a flexible hose operably coupled with the fuel output port (e.g., 704). In this implementation, for example, the fuel may comprise a flammable gas, such as natural gas, propane, etc. Further, in this implementation, the air supply port 708 may be disposed at or near the fuel supply pipe 312, adjacent to the burner chamber 504. For example, the flexible fuel supply pipe may be coupled with the fuel output port and the fuel supply pipe 312. Further, in this example, the air supply port 708 may be disposed in the fuel supply pipe 312, thereby allowing the fuel mixture to be directed into the burner chamber 504. In one implementation, the fuel supply pipe (e.g., 702) may comprise a tube that is configured to provide a venturi effect, for example, to which the fuel supply pipe 312 may be coupled.

Figure 8:
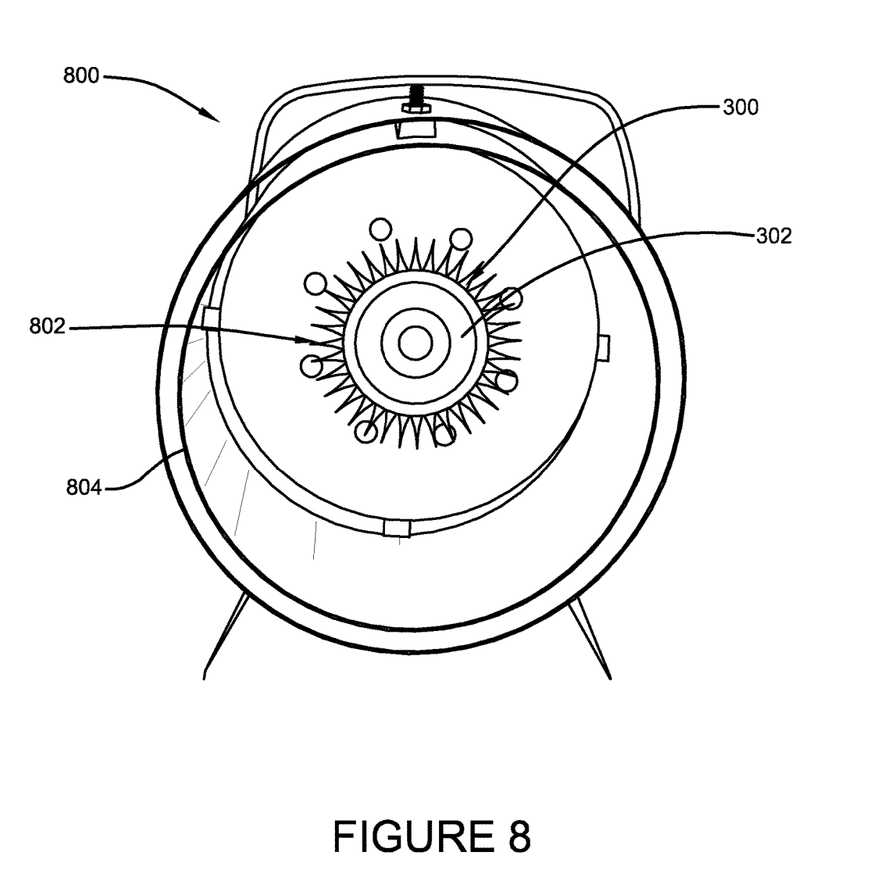
FIG. 8 is a component diagram illustrating an example implementation of an exemplary burner assembly described herein.
Figure 9:
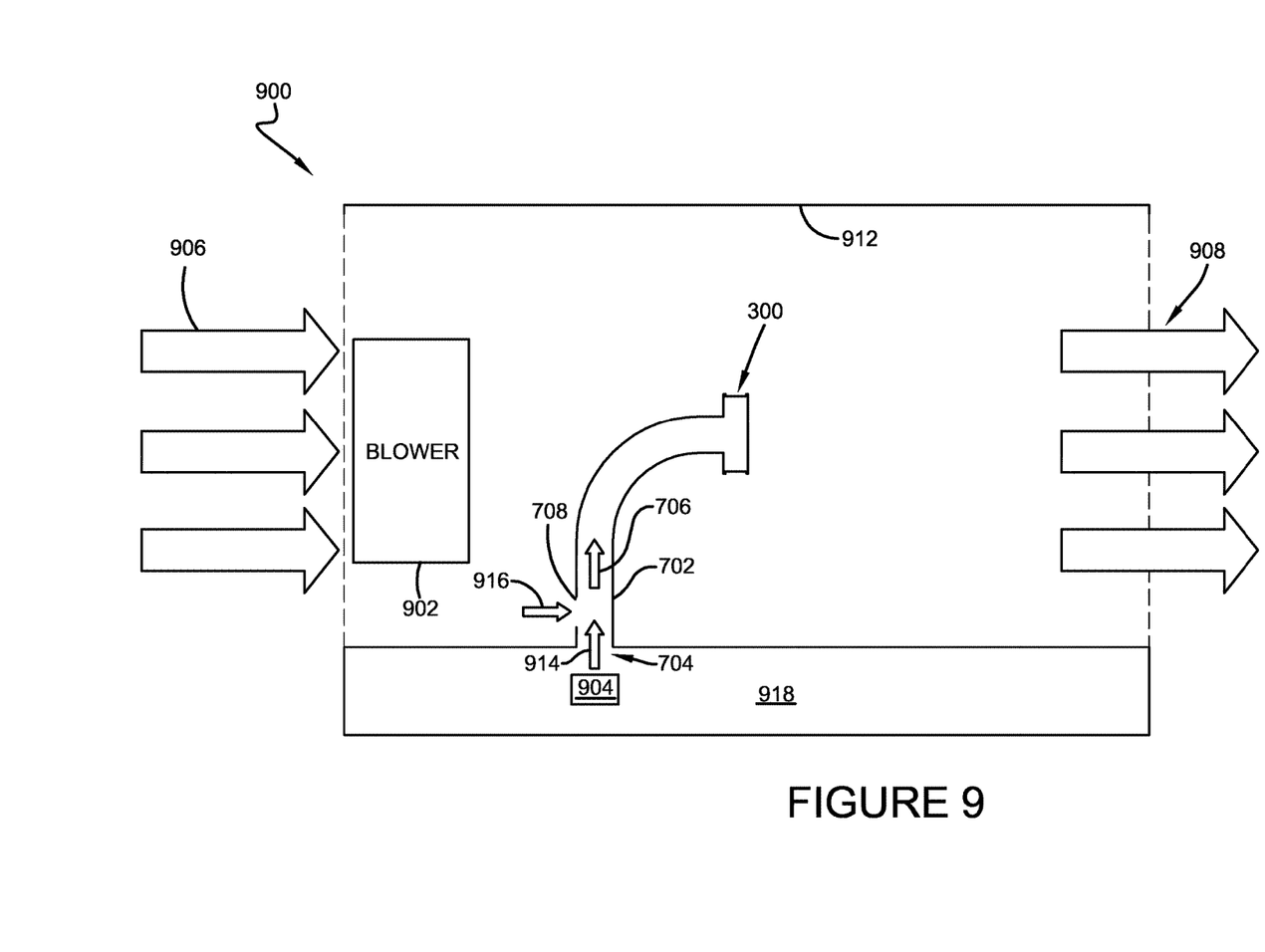
FIG. 9 is a component diagram illustrating an example implementation of an exemplary burner assembly described herein.

FIGS. 8 and 9 are component diagrams illustrating example implementations of an exemplary burner assembly 300. With continued reference to FIGS. 3-6, the exemplary burner assembly 300 can be installed in a central region of a forced air heater 800, 900. Further, the fuel supply pipe 702 may be fluidly coupled between the exemplary burner assembly 300 and a fuel supply system 904, such as a fuel pump or regulator coupled with a fuel source 918. As an example, the fuel supply system 904 may provide fuel 914 to the fuel output port 704, which can further direct the fuel 914 across an air inlet port 708. The air inlet port 708 may allow make-up air 916 to be mixed with the fuel 914, resulting in a fuel-air mixture 706, which may be directed toward the burner assembly 300. In this implementation, the fuel/fuel-air mixture 706 may be emitted in a substantially uniform manner around the periphery of the side wall(s) 306.

In one implementation, an igniter (not shown) can ignite the emitted fuel, thereby creating a flame 802 around the periphery of the side wall(s) 306. As illustrated in FIG. 8, the flame created by the exemplary burner assembly 300 can comprises a omni-directional, substantially uniform flame, having a short and sharp flame kernel, with mitigated lift-off from the outer surface of the side wall(s) 306. Further, in one implementation, the forced air heater 800, 900 can comprise a blower assembly 902. The blower assembly can direct incoming air 906 over the operational burner assembly 300, through a front duct 804, 912 thereby producing heated air output 908.

In one implementation, the blower assembly may comprise a fan producing a fan speed of (e.g., rotating a blade at) one-thousand five-hundred to three-thousand three-hundred revolutions per minute (RPMs), such as sixteen hundred and fifty RPMs. In one implementation, the fan may comprise a nine inch fan blade, a ten inch fan blade, or a blade between five to fifteen inches. In one implementation, the forced air heater 800, utilizing the exemplary burner assembly 300 (e.g., appropriately sized), may produce from thirty thousand to three-hundred thousand BTUs of heat. As an example, a first sized burner assembly 300 combined with a nine inch fan blade on a fan motor producing sixteen hundred and fifty RPMs may result in a one-hundred and fifty thousand BTU output. As another example, a second sized burner assembly 300 combined with a nine inch fan blade on a fan motor producing sixteen hundred and fifty RPMs may result in a one-hundred and seventy thousand BTU output. As another example, a third sized burner assembly 300 combined with a ten inch fan blade on a fan motor producing thirty-one hundred and fifty RPMs may result in a two-hundred and ten thousand BTU output.

Figure 10:
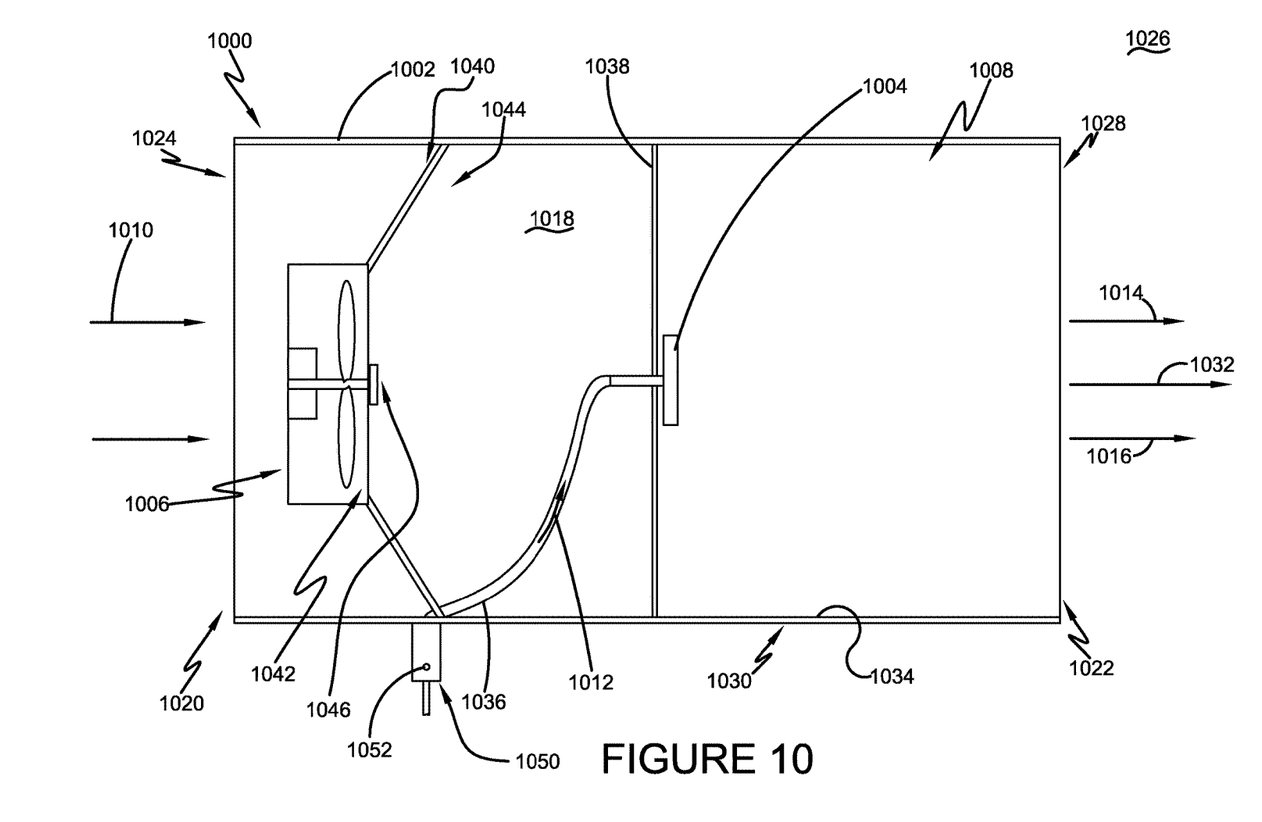
FIG. 10 is a component diagram illustrating an example implementation of an exemplary burner assembly described herein.

FIG. 10 is a component diagram illustrating an example implementation of a forced air heater 1000. In certain implementations, the forced air heater 1000 may comprise a housing 1002, a burner 1004, and an air movement device 1006.

The housing 1002 may define an interior region 1008 that can be configured to accept a flow of input air 1010, a flow of fuel 1012, or a flow of a mixture of air 1010 and fuel 1012; configured to contain combustion of air 1010 and fuel 1012, and configured to output a flow of heat 1014 and combustion products 1016. Air 1018 within the housing 1002 may be drawn from input air 1010 or from another source or inlet. In certain implementations, the housing 1002 may comprise a hollow elongated structure defining the interior region 1008 therein. The housing 1002 may comprise a first end 1020 and a second end 1022. The first end 1020 can comprise an inlet opening 1024 that can be configured to provide fluid communication therethrough between the environment 1026 and the interior region 1008. The second end 1022 may comprise an outlet opening 1028 that can be configured to provide fluid communication therethrough between the environment 1026 and the interior region 1008.

In certain implementations, the housing 1002 may form a duct 1030 defining an elongated interior region 1008, a first end 1020 and a second end 1022, an inlet opening 1024, and an outlet opening 1028. In certain implementations, the duct 1030 can be configured to permit a flow therethrough of a fluid, such as air 1018, or a mixture of air 1018 and fuel 1012, or combustion products 1016. In certain implementations, an outlet opening 1028 may have an area less than 0.2 square meters. In certain implementations, an outlet opening 1028 may have an area less than 0.1 square meters. In certain implementations, an outlet opening 1028 may have an area less than 0.05 square meters.

An interior region 1008 or a duct 1030 may be defined by an interior surface 1034 of a housing 1002. An interior region 1008 or a duct 1030 may be shaped as a box, a prism, a cylinder, or some other shape chosen by those skilled in the art. A cylindrical shaped duct 1030 may also be considered a pipe. An interior region 1008 or duct 1030 may have some definable roughness.

In certain implementations, the housing 1002 can be configured for operation wherein input air 1010 flows into the first end 1020 of housing 1002; wherein air 1018 is mixed with either fuel 1012 or a mixture of air 1018 and fuel 1012 to form a mixture of air 1018 and fuel 1012; wherein the mixture is combusted to produce heat 1014 and combustion products 1016; and wherein the heat 1014 and combustion products 1016 flow out of the second end 1022 of the housing 1002.

In certain implementations, a forced air heater 1000 may be configured to operate in a manner that permits some fraction of the input air 1010 that flows into the first end 1020 of housing 1002 not to participate in the combustion reaction and to flow out of the second end 1022 of the housing 1002 as output air 1032. In certain implementations, in operation, some fraction of the air 1018 that flows into the first end 1020 of housing 1002 does not participate in the combustion reaction and flows out of the second end 1022 of the housing 1002 as output air 1032. In certain implementations, the fraction of the air 1018 that flows out of the second end 1022 of the housing 1002 as output air 1032 is heated by heat 1014 such that the temperature of output air 1032 is higher than that of the input air 1010 and may be used to convey heat to the environment 1026 or to other regions or objects.

In certain implementations, a burner 1004 may comprise a site for combustion of a mixture of air 1018 and fuel 1012 to yield heat 1014 and combustion products 1016. A fuel 1012 may comprise kerosene, diesel, gasoline, propane, natural gas, alcohol, mixtures thereof, or other fuels. In certain implementations, and without limitations, the burner 1004 may be supplied with air 1018 supplied from the input air 1010. In certain implementations, the burner 1004 may be supplied with fuel 1012 or a mixture of air 1018 and fuel 1012. In certain implementations, the burner 1004 may be supplied with fuel 1012 or a mixture of air 1018 and fuel 1012 transported to the burner 1004 by a pipe 1036, hose, conduit, or other fluid conveyance. Fuel 1012 may be supplied to the forced air heater 1000 by an associated fuel tank, an associated fuel bottle, an associated supply line, or other associated fuel container or source.

An air movement device 1006 may comprise any device capable of intaking ambient air and providing air flow therefrom. In certain implementations, an air movement device 1006 may comprise an axial fan 1006, a centrifugal fan, a crossflow fan, another type of fan, a blower, an air compressor, a pump, or some combination thereof. In certain implementations, an air movement device is configured to establish an input air flow and output air flow where the output air flow can have a substantially higher head than does the input air flow. In certain implementations, an air movement device 1006 may be engaged with the housing 1002 so as to be partially or fully encompassed by the housing 1002. In certain implementations, an air movement device 1006 may be engaged with the housing so as to be fully encompassed by an interior region 1008 or duct 1030. In certain implementations, an air movement device 1006 may produce air flow through the forced air heater 1000 defined by a linear flow rate, a volumetric flow rate, a mass flow rate, or some other flow criteria. In certain implementations, air flow may be defined by a linear flow rate within the range of 0 to 1000 meters per second. In certain implementations, air flow may be defined by a volumetric flow rate within the range of 0 to 0.4 cubic meters per second. In certain implementations, air flow may be defined by a volumetric flow rate within the range of 0 to 0.5 kilograms per second.

In certain implementations, an air movement device 1006 may route an air flow through the forced air heater 1000 which is configured to impart substantially similar flow to other materials or fluids such as fuel 1012, combustion products 1016, output air 1032, or other fluids.

In certain implementations, a forced air heater 1000 may comprise a baffle 1038. A baffle 1038 may comprise a mesh, a burner plate, a screen, a flameholder plate, or other perforated surface or perforated plate. In certain implementations, a baffle 1038 may be substantially flat, may be substantially frustoconical, or may comprise other geometries. In certain implementations, a baffle 1038 may comprise closed regions and open regions. As an example, closed regions can be substantially impervious to the flow of air 1018 or fuel 1012 therethrough. Further, for example, closed regions can be substantially impervious to the flow of wind or air currents therethrough. As an example, open regions can be substantially open to the flow of air 1018 or fuel 1012 therethrough. Further, for example, open regions can be substantially open to the flow of wind or air currents therethrough. In some implementations, open regions may be defined by perforations. Perforations may be round, diamond-shaped, or any other shape.

In some implementations, a baffle 1038 may comprise a substantially closed baffle 1038. For example, a substantially closed baffle 1038 may comprise substantially more closed regions than open regions. In some implementations, a substantially closed baffle 1038 may comprise a baffle 1038 wherein the fraction of the area of the baffle defined by closed regions is substantially greater than the fraction of the area of the baffle defined by open regions. As an example, the percentage of closure can be the fraction of the area of the baffle defined by closed regions. In certain implementations, for example, a substantially closed baffle 1038 may comprise 60% closed, 70% closed, 80% closed, 90% closed, 95% closed, or some other percentage closed.

In some implementations, a baffle 1038 may be a substantially open baffle 1038. As an example, a substantially open baffle 1038 may comprise substantially more open regions than closed regions. In some implementations, a substantially open baffle 1038 may comprise a baffle 1038 wherein the fraction of the area of the baffle defined by open regions is substantially greater than the fraction of the area of the baffle defined by closed regions. As an example, a substantially open baffle 1038 may comprise 40% closed, 30% closed, 20% closed, 10% closed, 5% closed, or some other percentage closed.

In one aspect, a percentage of closure of a baffle 1038 may substantially influence the flow properties of air 1018 fuel 1012 or other fluids flowing therethrough. In some implementations, increasing a closure of the baffle 1038 may increase the resistance to fluid flow therethrough of the interior region 1008, or the duct 1030, or the forced air heater 1000. In some implementations, increasing the closure of baffle 1038 may increase the friction factor or the relative roughness of the interior region 1008 or the duct 1030. In some implementations, a substantially closed baffle 1038 may promote greater turbulence of a fluid flowing therethrough than would a substantially open baffle 1038. By contrast, a baffle 1038 having a greater opening may promote greater laminar flow of a fluid flowing therethrough than would a more closed baffle 1038.

In certain implementations, a forced air heater may comprise a diffuser 1040 configured to promote wind resistance. In one implementation, a diffuser can be a conduit comprising a first opening 1042 and a second opening 1044, where the area of the second opening 1044 is greater than the area of the first opening 1042. In certain implementations, the first opening 1042 of the diffuser 1040 is configured to receive flow from the air movement device 1006. In certain implementations, the first opening 1042 of the diffuser 1040 may be closely engaged with the outlet of the air movement device 1006 so that the first opening 1042 of the diffuser 1040 can be configured to receive substantially all of the flow from the air movement device 1006. In certain implementations, the diffuser is configured to receive flow from the air movement device 1006 through first opening 1042 and for the flow to exit the diffuser 1040 through second opening 1044. In certain implementations, the diffuser comprises merely two openings, first opening 1042 and second opening 1044. In certain implementations, the second opening 1044 of the diffuser 1040 may be closely engaged with the interior surface 1034 of the housing 1002. In certain implementations, a diffuser 1040 may be hollow and substantially frustoconical.

In certain implementations, a forced air heater 1000 may comprise a stagnation fitting 1046. A stagnation fitting 1046 can comprise a plate, block, or other geometry that is substantially impervious to flow. In certain implementations, a stagnation fitting 1046 can be placed along the axis of a hollow and substantially frustum-shaped diffuser 1040. In certain implementations, a stagnation fitting 1046 can be placed proximate to the axis of revolution of an air movement device 1006 comprising an axial fan. In certain implementations, a stagnation fitting 1046 can comprise a circular plate placed proximate to the axis of revolution of an axial fan. In certain implementations, a forced air heater 1000 that comprises certain adaptations, such as a diffuser 1040, or a stagnation fitting 1046, or both, to promote wind resistance, may not be combined with other adaptations, such as a substantially closed baffle 1038, to provide a desired level of wind resistance.

In certain implementations, a forced air heater 1000 may comprise a venturi 1050, configured to promote mixing of air 1018 and fuel 1012. A venturi 1050 can comprise a device that mixes air 1018 and fuel 1012. In certain implementations, a venturi 1050 may comprise an orifice (not shown) configured to introduce a fuel 1012 from an associated fuel source (not shown), an inlet aperture 1052 (e.g., air supply port) configured to introduce air, and an outlet (not shown) configured to output a mixture of the fuel 1012 and air 1018. In certain implementations, a forced air heater 1000 that comprises certain adaptations, such as a venturi 1050, to promote the mixing of air 1018 and fuel 1012, be combined with other adaptations, such as a substantially closed baffle 1038, to provide a desired level of mixing of air 1018 and fuel 1012.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A burner assembly comprising:
   a front wall plate;
   at least one side wall, operably engaged with the front wall plate, and comprising:
      a mesh inner layer; and a metallic rigid porous outer layer;
      wherein the combination of the mesh layer and rigid porous layer provide vias between the inside of the side wall and the outside of the side wall, the area of the vias comprising between ten and thirty percent of the total surface area of the side wall;
   a back wall plate, operably engaged with the at least one side wall, and comprising a through-hole configured to receive a fuel;
   a burner chamber defined by a combination of the front wall plate, the at least one side wall, and the back wall plate, the combined mesh layer and rigid porous layer of the side wall providing for fuel to be expelled around an outer periphery of the side wall in a substantially uniform manner; and
   a fuel supply tube, operably engaged with the back wall plate, and configured to direct the fuel into the burner chamber.

2. The burner assembly of claim 1, the side wall comprising an annular shape.

3. The burner assembly of claim 1, the mesh layer comprising a double fine mesh.

4. The burner assembly of claim 1, the mesh layer comprising a metal mesh.

5. The burner assembly of claim 1, the at least one side wall comprising:
   a first mesh layer; and
   a second mesh layer.

6. The burner assembly of claim 1, the fuel supply tube is operably engaged with one or more of:
   a fuel line orifice configured to provide a venturi effect to the fuel supply tube; and
   an air supply port configured to introduce air into the fuel supply tube for mixing with the fuel resulting in a fuel-air mixture.

7. The burner assembly of claim 1, the front wall plate and the back wall plate are selectively coupled together by one or more fasteners.

8. The burner assembly of claim 1, the burner assembly configured to be installed in a forced air heater.

9. The burner assembly of claim 8, the forced air heater comprising a blower assembly configured to have a fan speed of between one-thousand five-hundred and three-thousand three-hundred revolutions per minute (RPMs).

10. The burner assembly of claim 9, the fan comprising one of:
    a nine inch fan blade assembly; and
    a ten inch fan blade assembly.

11. The burner assembly of claim 10, the forced air heater produces between thirty thousand and three-hundred thousand British thermal units (BTUs) of heat.

12. The burner assembly of claim 1, the fuel is emitted from the at least one side wall at between ten and thirty pounds per square inch (PSI).

13. The burner assembly of claim 1, the side wall comprising a polygon shape.

* * * * *